Nov. 15, 1927.  
C. E. HALABY  
1,649,587  
TANK LOCK  
Filed April 17, 1925
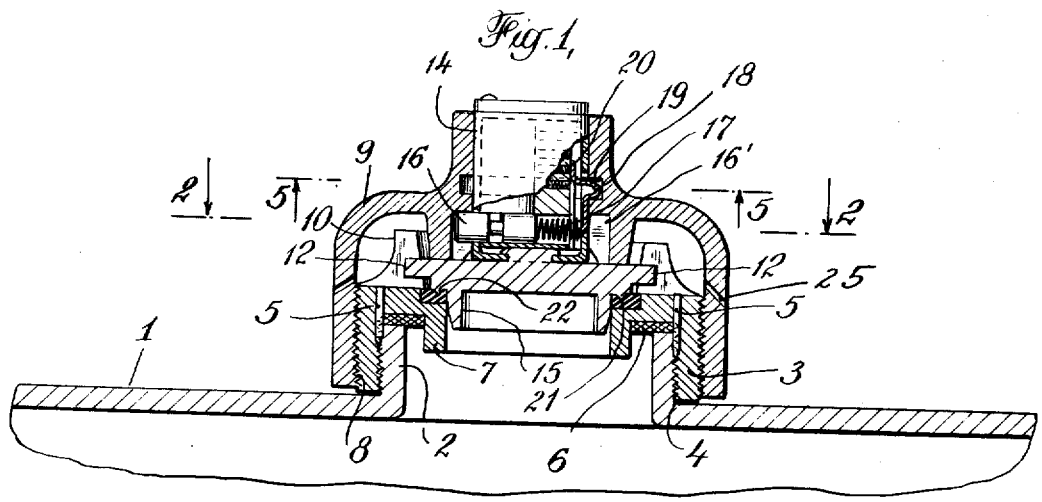
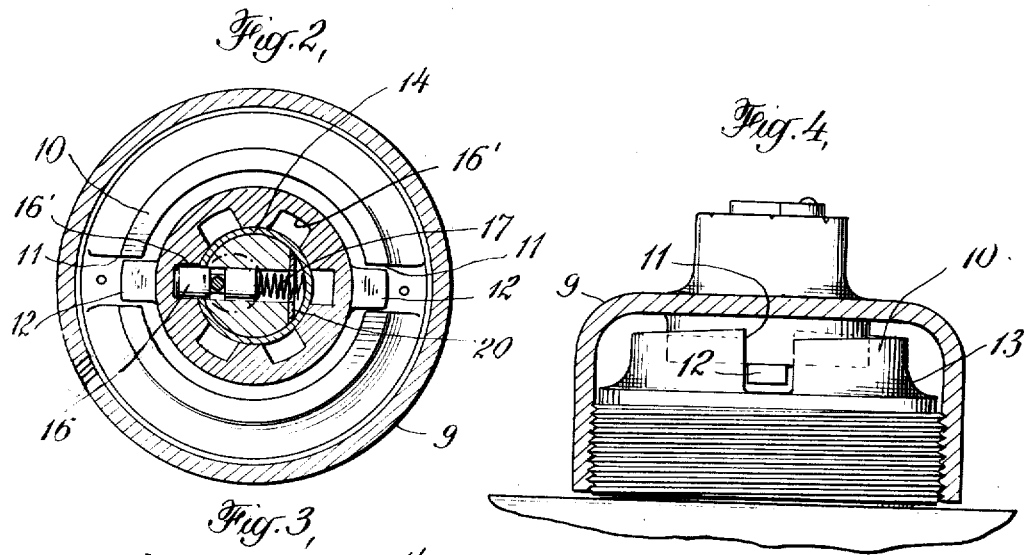
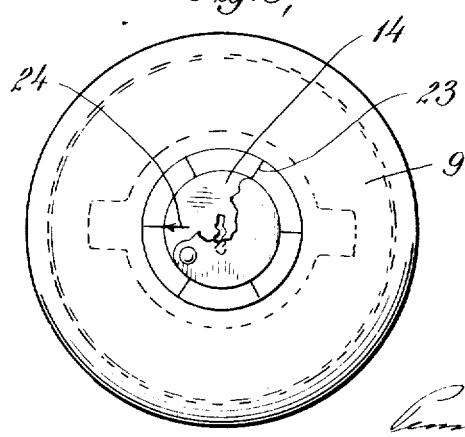
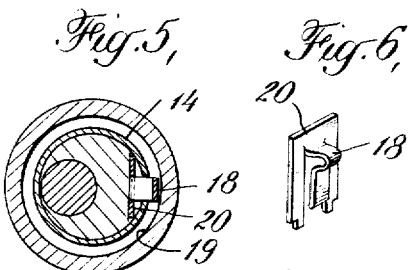
INVENTOR  
C. Edwin Halaby  
BY  
ATTORNEYS Patented Nov. 15, 1927.

1,649,587

UNITED STATES PATENT OFFICE.

CAMILE EDWIN HALABY, OF NEW YORK, N. Y., ASSIGNOR TO YANKEE LOCK CORPORATION, OF NEW YORK, N. Y., A CORPORATION OF NEW YORK.

TANK LOCK.

Application filed April 17, 1925. Serial No. 23,800.

My invention relates to closures for tanks and, more particularly, to lockable closures or covers for the fuel tanks of automobiles. This invention constitutes an improvement in the type of tank locks or lockable covers used for the purpose of preventing the unauthorized removal of gasoline from the fuel tank of an automobile. One of the principal objects of my invention is to provide a lockable cover of this character which can be used as a means for preventing unauthorized use of an automobile equipped with the invention.

In providing a lockable cover for the fuel tanks of automobiles, it is desirable to provide means for adapting a certain sized cap for use with filling necks of various sizes. This makes it possible to provide the lockable cover, containing mechanism which is necessarily quite expensive, in a single size only instead of in a large number of sizes, which would necessarily increase the cost of supplying the invention to the trade. Accordingly, one of the objects of my invention is to provide an improved adapting ring constructed so that it can be easily made in a large number of sizes at low cost and so that a standard sized cap will fit on to an adapting ring of any size.

The lockable covers heretofore employed have not been entirely satisfactory because they are not suited to the requirements of all types of automobiles. For some types, the cap for the filling tank should form an air-tight seal, while for others it is necessary to have an air passage through the cap for the purpose of admitting air to the tank as the fuel is being withdrawn therefrom. My invention is of such a character that it meets the requirements of both types of automobiles just referred to. My improved filling cap can be adjusted so as to leave an air port, or to seal the tank against the entrance of air, as may be desired; and the cover can be locked in either of these positions. Automobiles of the type requiring a certain amount of air pressure in the fuel tank during use, can be locked against use by locking the cover in a position which leaves the tank open to the atmosphere. On the other hand, automobiles which must have the tank open to the atmosphere in order to operate, can be locked against use by locking the cover in a position which will seal the tank against the entrance of air. From a practical standpoint, it is important to note the fact that when the cover is locked in the last mentioned position, the fuel in the tank is prevented from evaporating and escaping into the atmosphere.

The adapting ring of my improved lockable cover consists of a collar which can be permanently fixed to a filling neck. This collar serves as a means for changing the effective size of the neck to a standard size for receiving a filling cap of this standard size. I prefer to construct the adapting ring or collar so that it performs a function in addition to changing the effective size of the filling neck. This ring can be provided with one or more abutments cooperating with locking mechanism carried by the cap; hence, if the adapting ring is permanently fixed to the filling neck, the cap can be securely locked to the tank by locking it to the adapting ring.

The filling cap is provided with a cylinder loosely mounted therein and adapted to be locked thereto so as to prevent relative rotation of these parts. The cylinder carries one or more lugs adapted to engage abutments on the adapting ring whereby relative rotation of the cylinder and adapting ring is prevented as soon as the lugs engage the abutments. The adapting ring carries a packing ring adapted to cooperate with the cylinder in the cover to provide an air-tight seal for the filling neck when the cap occupies a certain position. When the cap occupies a different position, one or more air passages are provided between the interior of the filling neck and the inside of the cap, which is open to the atmosphere. The inside of the filling cap communicates with the atmosphere through one or more openings preferably of special construction hereinafter described.

My invention can be best understood by considering the following detailed description, which is to be taken in conjunction with the accompanying drawings, in which Figure 1 is a vertical sectional view of one embodiment of my invention applied to the filling neck of a tank.

Figure 2 is a transverse section taken on line 2—2 of Figure 1, showing the construction of the lockable cover.

Figure 3 is a plan view of the embodiment of the invention shown in Figure 1.

Figure 4 is a vertical sectional view of the cap of Figure 1, applied to an adapting ring.

Figure 5 is a transverse section taken on line 5—5 of Figure 1, showing details of construction, and Figure 6 is a perspective view of a spring locking device employed in the embodiment of my invention shown in Figure 1.

In Figure 1, I have shown a portion of a tank 1 which may be an ordinary automobile fuel tank having an externally threaded filling neck 2. An adapting ring 3, having internal threads 4 adapted to engage the threads on the filling neck 2, is shown screwed onto the filling neck and permanently fixed thereto by means of one or more pins 5. The adapting ring 3 is applied to the filling neck 2 by simply screwing it onto the neck to the desired extent and then the pins 5, which fit into holes in the adapting ring in alignment with the internal threads 4 of this ring, are driven down so as to destroy the screw threads in the path of the pins as will be readily understood. These pins, wedged in between the filling neck 2 and the adapting ring 3, effectively prevent the adapting ring from being unscrewed from the neck even though a heavy wrench is applied to the ring. The pins 5, which are preferably made of hardened steel, would have to strip all of the threads on both the filling neck 2 and the adapting ring 3 before the latter could be removed and it will be appreciated that this cannot be done without applying such force to the adapting ring as would destroy the tank itself.

A packing washer 6 is preferably provided between the upper edge of the filling neck and the adjacent surface of the adapting ring 3 so as to form an air-tight seal at this point. The adapting ring is preferably provided with a downwardly projecting ring 7 which protects the packing washer 6 and serves as a guide for the lower end of a cylinder carried by the filling cap and described hereinafter. The adapting ring can be used with a filling neck having internal screw threads in which case the downwardly projecting ring 7 would be provided with external screw threads adapted to engage the threads on the filling neck.

The adapting ring 3 is externally threaded at 8 so that a cap 9 can be screwed down on the adapting ring 3. Since the adapting ring 3 is permanently fixed to the filling neck 2, it is evident that if the filling cap 9 could be locked to the ring after the cap is screwed down on the ring, the cap would be locked to the filling neck and could not be removed therefrom except by releasing the locking mechanism. Accordingly, I have provided locking mechanism within the cap, adapted to cooperate with the adapting ring to lock these parts together. The adapting ring is provided with an upwardly projecting annular collar 10 having one or more notches therein, forming abutments 11 adapted to engage bolts or lugs 12 carried by the cap 9. The upper face of the collar 10 is cut at an angle as best shown in Figure 4, so that when the cap is screwed down on to the adapting ring, the lugs 12 have ample opportunity to strike against the abutments 11 without binding on the upper face of the collar 10. The collar 10 is preferably constructed so that it is of greater width at the base 13 thereof than at the upper edge. This makes the collar much stronger than it would be if it were the same width at the bottom as it is at the top. It is desirable to have the collar quite thin at the top so as to reduce the weight and bulk of the adapting ring.

The lugs or bolts 12, carried by the cap 9, are fixed to a cylinder 14, and may be integral with a downwardly projecting ring 15 which is adapted to be guided by the downwardly projecting ring 7, above described, forming part of the adapting ring. The cylinder 14 is loosely mounted in the cap 9 and can rotate freely with respect to the cap, except when locked thereto by means of a locking bolt 16. This bolt is normally pressed outward by means of a spring 17 carried within the cylinder 14 and the bolt is adapted to enter any one of a plurality of holes or openings 16 in the top portion of the cap 9. When the bolt enters one of these openings, the cylinder 14 is locked against rotation with respect to the cap 9 and it will be understood that if the bolts 12 fixed to the cylinder are in engagement with the abutments 11 on the adapting ring when the cylinder 14 is thus locked to the cap 9, the cap is firmly locked to the adapting ring and cannot be rotated with respect thereto. By inserting a key into the key-hole in the top of the cylinder 14, the bolt 16 can be withdrawn and then the cap 9 can be rotated even though the lugs 12 engage the abutments on the adapting ring.

The cylinder 14 carries a spring finger 18 adapted to engage an annular groove 19 in the upper part of the cap. This finger 18 may be integral with a small plate 20 carried in a vertical position within the cylinder 14. The purpose of the spring finger 18 is to prevent the cylinder 14 from being easily removed from the cap as will be understood.

The adapting ring 3 has an annular groove therein just above the annular depending ring 7, which extends into the mouth of the filling neck. This groove is adapted to receive a packing washer 21 which may be made of soft rubber or other suitable material. I prefer to construct the upright annular portion 10 of the adapting ring so that it projects over the outer edge of the packing washer 21 as best shown in Figure 1. This serves to hold the packing washer firmly in place at all times so as to prevent its accidental removal when the tank is being filled. The annular portion 15 carried by the cylinder 14 engages the inner face of the packing washer 21 and serves as a support for this portion of the packing washer when the cap is screwed down in place on the adapting ring. A sharp annular ridge 22 surrounds the annular portion 15 and is adapted to engage the upper portion of the packing washer 21 so as to form a tight seal at this point.

In order to secure the cap 9 to the adapting ring 3, it is first necessary to screw the cap down onto the adapting ring until one of the bolts 12 engages an abutment 11 on the upper part of the adapting ring. It will be understood that until this occurs the cylinder 14 rotates with the cap 9, the cylinder being ordinarily locked to the cap by means of the bolt 16. If it is assumed that these parts are locked together when one of the bolts 12 first strikes an abutment 11, then the cap cannot be screwed into the ring any further until the locking mechanism within the cylinder 14 is released. This can be done by inserting a key in the cylinder 14 and turning it to withdraw the bolt 16. Thereafter the cap 9 can be screwed further onto the adapting ring 3, the cylinder 14 being held stationary by virtue of the bolts 12 engaging the abutments 11 on the ring. If the cap is given only a few turns after the bolts 12 first engage the abutments 11, the annular ridge 22 carried by the cylinder will not engage the packing washer 21 and the inside of the tank will still be in communication with the inside of the cap. If the key is withdrawn while the cap is in this position, and the cap turned until the bolt 16 springs into one of the openings 16' in the upper part of the cap, then the cap will be securely locked to the adapting ring in such position as to permit air to enter the tank. A plurality of small radially disposed grooves 23 (shown in Figure 3) cooperating with an arrow or reference line 24 on the cylinder 14 can be used for the purpose of indicating the position of the bolt 16 with reference to the openings 16' in the cap. The grooves 23 may be located directly above corresponding openings 16' and the number of revolutions of the cap after the cylinder 14 is held stationary can be noted by watching the movement of the arrow 24 with respect to the grooves 23. The inside of the cap communicates with the atmosphere through one or more passages 25. I prefer to construct these passages so that they are inclined at an angle to the portion of the outer surface of the cap adjacent to the passages as shown in Figure 1. This serves to prevent moisture and foreign particles from gaining access to the interior of the cap.

If it is desired to screw the cap down onto the ring 3 until an air-tight seal is formed, the key is not withdrawn from the cylinder 14 until the cap can be no longer turned. This indicates that the ridge 22 is firmly embedded in the packing washer 21. The cap can be turned until the arrow 24 coincides with one of the grooves 23 and then the key may be withdrawn to permit the bolt 16 to enter the corresponding opening 16' in the cap.

It is to be understood that the details of my invention can be modified without departing from the spirit of my invention which is not limited to the specific embodiment illustrated and described but includes such modifications thereof as fall within the scope of the appended claims.

It is also to be understood that my invention can be used as a lockable closure for pipes and filling tanks of various kinds and that its use is in no sense limited to its application to the fuel tanks of automobiles.

I claim:

1. In a device of the type described, the combination with a tank having a filling neck, of a ring engaging the filling neck, means for permanently fixing the ring to the neck, a cap adapted to be locked to said ring, said cap enclosing said ring, said ring having an annular portion with a notch in the upper edge thereof forming a locking abutment, said annular portion extending out away from the mouth of the filling neck and being of greater thickness near the neck than at the outer edge of said annular portion.

2. In a device of the type described, the combination with a tank having a filling neck, of a ring engaging the filling neck, means for permanently fixing the ring to the neck, a cap adapted to be locked to said ring, said cap substantially enclosing said ring, said ring having an upwardly extending annular portion with a notch in the upper edge thereof forming a locking abutment, said annular portion extending out away from the mouth of the filling neck, and having the outside thereof curved so that the thickness of this outer portion gradually increases toward the filling neck.

3. In a device of the type described, the combination with a tank having a filling neck, of a ring engaging the filling neck and having screw threads thereon, a cap adapted to be screwed onto said ring, a cylinder rotatably mounted in said cap, and locking mechanism including a bolt carried by said cylinder, said cap having a plurality of openings therein adapted to receive said bolt.

4. In a device of the type described, the combination with a tank having a filling neck, of a ring engaging the filling neck and having screw threads thereon, a cap adapted to be screwed onto said ring, a cylinder rotatably mounted in said cap, locking mechanism carried by said cylinder for locking the cylinder to said cap, and a spring finger carried by said cylinder, said cap having an annular groove therein adapted to receive said finger.

5. In a device of the type described, the combination with a tank having a filling neck, of a ring engaging the filling neck and having screw threads thereon, a packing washer supported by said ring, and a cap adapted to be screwed onto said ring, a cylinder mounted in said cap, and means for locking the cylinder to the cap, said cylinder carrying a sharp annular ridge adapted to engage said washer.

6. In a device of the type described, the combination with a tank having a filling neck, of a ring engaging the filling neck and having screw threads thereon, a packing washer supported by said ring, and a cap adapted to be screwed onto said ring, a cylinder mounted in said cap, and means for locking the cylinder to the cap, said cylinder carrying a sharp annular ridge adapted to engage said washer and said cylinder having an annular portion adapted to form a support for the inner edge of said washer.

7. In a device of the type described, the combination with a tank having a filling neck, of a ring engaging the filling neck and having screw threads thereon, and a cap having a screw threaded portion adapted to engage said ring, said cap having an air-passage therethrough, communicating with the inside of the cap above said screw threaded portion, said passage being inclined at an angle to the portion of the outer surface of the cap adjacent to said passage.

8. In a device of the type described, the combination with a tank having a filling neck, of a ring engaging the filling neck and having screw threads thereon, a cap adapted to be screwed onto said ring, and having a plurality of openings therein adapted to receive a locking bolt, a cylinder rotatably mounted in said cap, locking mechanism including a bolt carried by said cylinder and adapted to enter in one of the openings in said cap, and means for indicating the position of said bolt with respect to the openings in said cap.

In testimony whereof I affix my signature.

C. EDWIN HALABY neck, of a ring engaging the filling neck and having screw threads thereon, a cap adapted to be screwed onto said ring, a cylinder rotatably mounted in said cap, locking mechanism carried by said cylinder for locking the cylinder to said cap, and a spring finger carried by said cylinder, said cap having an annular groove therein adapted to receive said finger.

5. In a device of the type described, the combination with a tank having a filling neck, of a ring engaging the filling neck and having screw threads thereon, a packing washer supported by said ring, and a cap adapted to be screwed onto said ring, a cylinder mounted in said cap, and means for locking the cylinder to the cap, said cylinder carrying a sharp annular ridge adapted to engage said washer.

6. In a device of the type described, the combination with a tank having a filling neck, of a ring engaging the filling neck and having screw threads thereon, a packing washer supported by said ring, and a cap adapted to be screwed onto said ring, a cylinder mounted in said cap, and means for locking the cylinder to the cap, said cylinder carrying a sharp annular ridge adapted to engage said washer and said cylinder having an annular portion adapted to form a support for the inner edge of said washer.

7. In a device of the type described, the combination with a tank having a filling neck, of a ring engaging the filling neck and having screw threads thereon, and a cap having a screw threaded portion adapted to engage said ring, said cap having an air-passage therethrough, communicating with the inside of the cap above said screw threaded portion, said passage being inclined at an angle to the portion of the outer surface of the cap adjacent to said passage.

8. In a device of the type described, the combination with a tank having a filling neck, of a ring engaging the filling neck and having screw threads thereon, a cap adapted to be screwed onto said ring, and having a plurality of openings therein adapted to receive a locking bolt, a cylinder rotatably mounted in said cap, locking mechanism including a bolt carried by said cylinder and adapted to enter in one of the openings in said cap, and means for indicating the position of said bolt with respect to the openings in said cap.

In testimony whereof I affix my signature.

C. EDWIN HALABY

Certificate of Correction.

Patent No. 1,649,587.          Granted November 15, 1927, to

CAMILE EDWIN HALABY.

It is hereby certified that error appears in the printed specification of the above-numbered patent requiring correction as follows: Page 3, line 28, for the word "into" read *onto;* and that the said Letters Patent should be read with this correction therein that the same may conform to the record of the case in the Patent Office.

Signed and sealed this 13th day of December, A. D. 1927.

[SEAL.]
M. J. MOORE,
*Acting Commissioner of Patents.*

Certificate of Correction.

Patent No. 1,649,587. Granted November 15, 1927, to

CAMILE EDWIN HALABY.

It is hereby certified that error appears in the printed specification of the above-numbered patent requiring correction as follows: Page 3, line 28, for the word "into" read *onto;* and that the said Letters Patent should be read with this correction therein that the same may conform to the record of the case in the Patent Office.

Signed and sealed this 13th day of December, A. D. 1927.

[SEAL.]
M. J. MOORE,
*Acting Commissioner of Patents.*